United States Patent
Yang et al.

(10) Patent No.: US 11,354,530 B2
(45) Date of Patent: Jun. 7, 2022

(54) ELECTRONIC APPARATUS AND OPERATING METHOD THEREOF

(71) Applicant: Egis Technology Inc., Taipei (TW)

(72) Inventors: Chen Yang, Taipei (TW); Kuan-Yi Lin, Taipei (TW); Chia-Wei Lin, Taipei (TW); Yu-Hua Lin, Taipei (TW)

(73) Assignee: Egis Technology Inc., Hsinchu (TW)

( * ) Notice: Subject to any disclaimer, the term of this patent is extended or adjusted under 35 U.S.C. 154(b) by 107 days.

(21) Appl. No.: 17/086,473

(22) Filed: Nov. 2, 2020

(65) Prior Publication Data

US 2021/0224574 A1  Jul. 22, 2021

Related U.S. Application Data

(60) Provisional application No. 62/963,546, filed on Jan. 21, 2020, provisional application No. 63/027,964, filed on May 21, 2020.

(30) Foreign Application Priority Data

Sep. 14, 2020  (CN) .......................... 202010960874.7

(51) Int. Cl.
  *G06K 9/46*    (2006.01)
  *G06K 9/00*    (2022.01)
  *G06K 9/20*    (2006.01)

(52) U.S. Cl.
  CPC ......... *G06K 9/4652* (2013.01); *G06K 9/0004* (2013.01); *G06K 9/00013* (2013.01);
  (Continued)

(58) Field of Classification Search
  CPC ............... G06K 9/4652; G06K 9/0004; G06K 9/00087; G06K 9/00114; G06K 9/00906;
  (Continued)

(56) References Cited

U.S. PATENT DOCUMENTS 5,926,555 A * 7/1999 Ort ..................... G06K 9/00067
                                                      382/124
6,895,104 B2 * 5/2005 Wendt .................. G06K 9/0008
                                                      283/69

(Continued)

FOREIGN PATENT DOCUMENTS

CN   110020622    7/2019
CN   110097031    8/2019
(Continued)

OTHER PUBLICATIONS

"Office Action of Taiwan Counterpart Application", dated Oct. 5, 2021, p. 1-p. 6.

*Primary Examiner* — John B Strege
(74) *Attorney, Agent, or Firm* — JCIPRNET

(57) ABSTRACT

An electronic apparatus and an operating method thereof are provided. The electronic apparatus includes an optical fingerprint sensor and a processor. The optical fingerprint sensor is configured to obtain a fingerprint image. The processor is coupled to the optical fingerprint sensor and analyzes the fingerprint image to calculate at least one of a color pixel ratio and a light reflectance corresponding to the fingerprint image. The processor searches a background database according to at least one of the color pixel ratio and the light reflectance to obtain a background image. The processor corrects the fingerprint image according to the background image to obtain a corrected fingerprint image.

20 Claims, 4 Drawing Sheets

(52) U.S. Cl.
CPC ..... *G06K 9/00073* (2013.01); *G06K 9/00087* (2013.01); *G06K 9/00114* (2013.01); *G06K 9/00906* (2013.01); *G06K 9/209* (2013.01); *G06K 9/4661* (2013.01)

(58) Field of Classification Search
CPC ............... G06K 9/209; G06K 9/00013; G06K 9/00073; G06K 9/4661; G06K 9/00107
See application file for complete search history.

(56) References Cited

U.S. PATENT DOCUMENTS

| | | | |
|---|---|---|---|
| 2008/0050030 A1* | 2/2008 | Hara | G06K 9/38 382/254 |
| 2018/0239941 A1 | 8/2018 | Mackey et al. | |
| 2018/0365470 A1* | 12/2018 | Li | G06T 5/50 |
| 2020/0175142 A1* | 6/2020 | Chiang | G06K 9/00073 |
| 2020/0193138 A1* | 6/2020 | Li | G06K 9/0012 |
| 2020/0311380 A1* | 10/2020 | Zhang | G06T 5/50 |
| 2020/0327301 A1* | 10/2020 | Shih | H04N 5/353 |
| 2021/0042496 A1* | 2/2021 | Choe | G06F 21/32 |

FOREIGN PATENT DOCUMENTS

| | | |
|---|---|---|
| CN | 110197101 | 9/2019 |
| EP | 3594846 | 1/2020 |
| TW | 201719491 | 6/2017 |
| TW | 201915649 | 4/2019 |

\* cited by examiner

ELECTRONIC APPARATUS AND OPERATING METHOD THEREOF

CROSS-REFERENCE TO RELATED APPLICATION

This application claims the priority benefit of U.S. provisional application No. 62/963,546, filed on Jan. 21, 2020, U.S. provisional application No. 63/027,964, filed on May 21, 2020, and China application no. 202010960874.7, filed on Sep. 14, 2020. The entirety of each of the above-mentioned patent applications is hereby incorporated by reference herein and made a part of this specification.

BACKGROUND

Technical Field

The disclosure relates to an apparatus, and in particular, to an electronic apparatus adopting the optical fingerprint sensing technology and an operating method thereof.

Description of Related Art

Regarding the large-area optical fingerprint sensors, a fingerprint sensor has to pass through, for example, the lens or collimator of the fingerprint sensor as well as multiple layers and complex materials of the panel such as the self-luminous layer and glass, to perform fingerprint image sensing. As such, background noise is easily generated owing to different fingerprint reflectances, such as the moire noise and other fixed pattern noise (FPN).

SUMMARY

Accordingly, the disclosure provides an electronic apparatus and an operating method thereof capable of generating a favorable fingerprint sensing image.

An electronic apparatus provided by the dis closure includes an optical fingerprint sensor and a processor. The optical fingerprint sensor is configured to obtain a fingerprint image. The processor is coupled to the optical fingerprint sensor and analyzes the fingerprint image to calculate at least one of a color pixel ratio and a light reflectance corresponding to the fingerprint image. The processor searches a background database according to at least one of the color pixel ratio and the light reflectance to obtain a background image. The processor corrects the fingerprint image according to the background image to obtain a corrected fingerprint image.

An operating method provided by the disclosure is adapted to an electronic apparatus including an optical fingerprint sensor and a background database. The operating method includes the following steps. A fingerprint image is obtained through the optical fingerprint sensor. The fingerprint image is analyzed to calculate at least one of a color pixel ratio and a light reflectance corresponding to the fingerprint image. The background database is searched according to at least one of the color pixel ratio and the light reflectance to obtain a background image. The fingerprint image is corrected according to the background image to obtain a corrected fingerprint image.

To sum up, in the electronic apparatus and the operating method thereof provided by the disclosure, the background database may be pre-established. When the electronic apparatus performs fingerprint sensing, the electronic apparatus may search the background database according to at least one of the color pixel ratio and the light reflectance corresponding to the current fingerprint image, so as to obtain the background image most suitable to the current sensing scenario and eliminate or reduce the background noise in the fingerprint image according to such background image.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
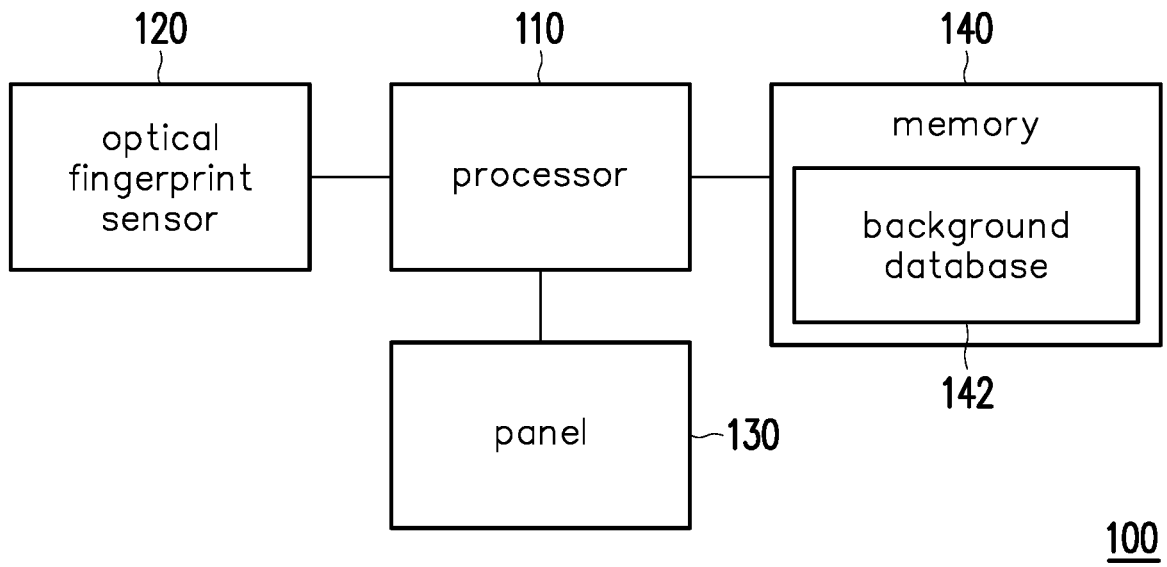
FIG. 1 is a schematic view of an electronic apparatus according to an embodiment of the disclosure.

In order to make this disclosure more comprehensible, several embodiments are described below as examples of implementation of this disclosure. Moreover, elements/components/steps with the same reference numerals are used to represent the same or similar parts in the drawings and embodiments where appropriate.

FIG. 1 is a schematic view of an electronic apparatus according to an embodiment of the disclosure. With reference to FIG. 1, an electronic apparatus 100 includes a processor 110, an optical fingerprint sensor 120, a panel 130, and a memory 140. The processor 110 is coupled to the optical fingerprint sensor 120, the panel 130, and the memory 140. The memory 140 is configured to pre-store a background database 142. In an embodiment, the optical fingerprint sensor 120 may be, for example, an in-display fingerprint sensor, which should however not be construed as limitations to the disclosure. The optical fingerprint sensor 120 may be disposed below a fingerprint sensing region of the panel 130, for example. When a user places a finger on the fingerprint sensing region of the panel 130, the panel 130 may provide illuminating light to the finger. Further, the optical fingerprint sensor 120 may sense and sample the fingerprint of the finger to provide a fingerprint image to the processor 110. In this embodiment, the processor 110 may read the memory 140, obtains a background image corresponding to the fingerprint image according to quantum efficiencies (QEs) and/or light reflection degrees of various fingerprints, and corrects the fingerprint image by using the background image. Note that the QEs and/or the light reflection degrees of various fingerprints provided herein are fingerprint sensing results in response to different human race skin colors or different light reflectances.

In this embodiment, the electronic apparatus 100 may be an electronic apparatus featuring a fingerprint sensing function, such as a mobile phone, a tablet computer, a computer, or a smart watch, which is not particularly limited by the disclosure. Further, the panel 130 may be, for example, an organic light-emitting diode (OLED) display panel or other types of self-emissive display panels, which is not particularly limited by the disclosure either.

Figure 2:
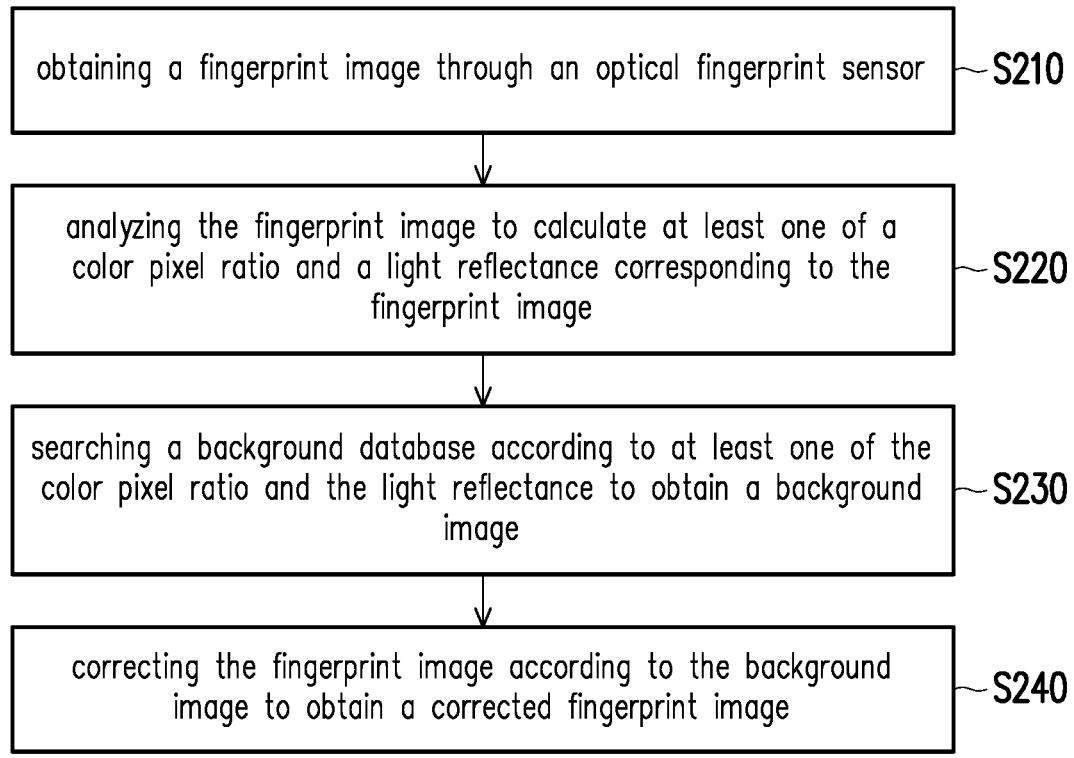
FIG. 2 is a flow chart of an operating method according to an embodiment of the disclosure.
Figure 3:
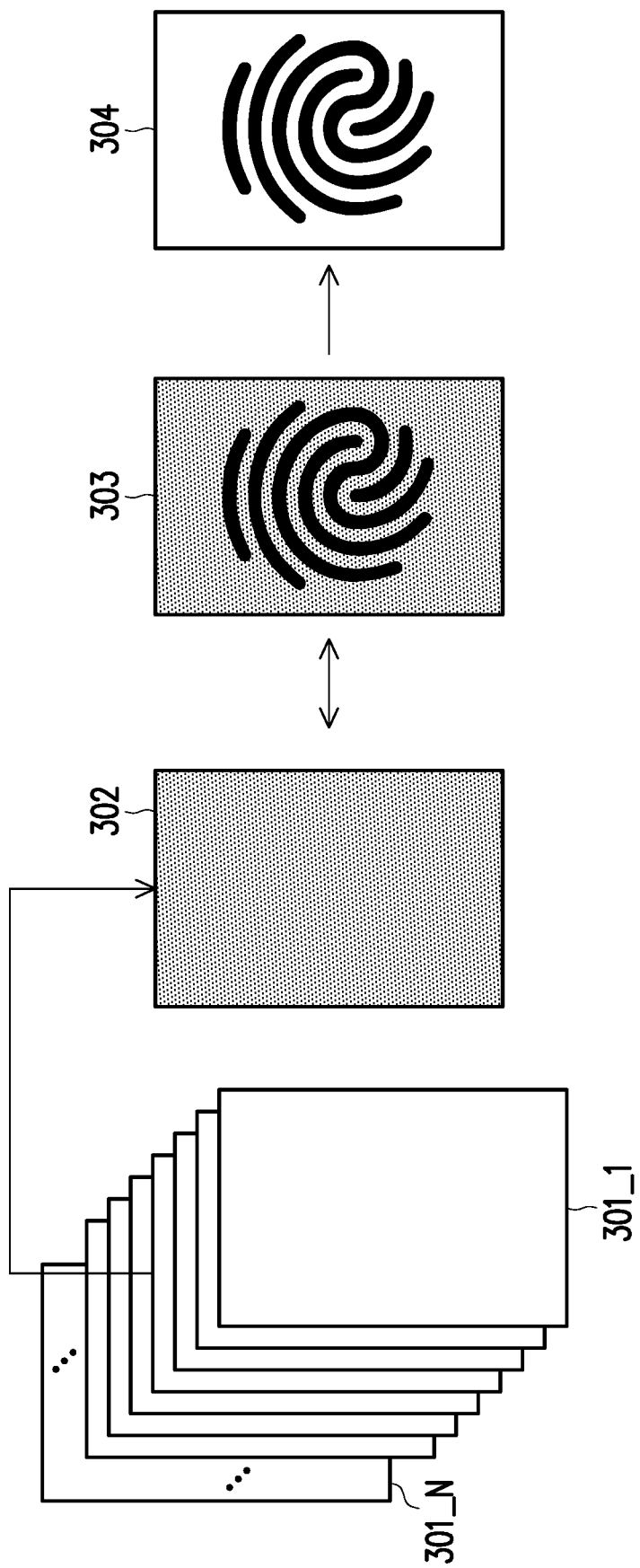
FIG. 3 is a schematic view of a background image and a fingerprint image according to an embodiment of the disclosure.

FIG. 2 is a flow chart of an operating method according to an embodiment of the disclosure. FIG. 3 is a schematic view of a background image and a fingerprint image according to an embodiment of the disclosure. With reference to FIG. 1 to FIG. 3, when the user places the finger on the fingerprint sensing region of the panel 130 of FIG. 1, the panel 130 may provide illuminating light to the finger, and the electronic apparatus 100 may perform the following steps S210 to S240 to sense and correct the fingerprint image. In step S210, the processor 110 may obtain a fingerprint image 303 through the optical fingerprint sensor 120. In step S220, the processor 110 may analyze the fingerprint image 303 to calculate at least one of a color pixel ratio and a light reflectance corresponding to the fingerprint image 303. In this embodiment, the color pixel ratio is configured to represent the corresponding human race skin color, and the light reflectance is configured to represent the light reflection degree corresponding to the finger. In other words, the processor 110 may determine the QE and/or light reflection degree of a current sensing object (finger) through analyzing the fingerprint image 303.

In step S230, the processor 110 may search the background database 142 according to at least one of the color pixel ratio and the light reflectance to obtain a background image 302. In the present embodiment, the background database 142 may pre-store one or a plurality of reference background images 301_1 to 301_N, where N is a positive integer greater than 0. The reference background images 301_1 to 301_N individually correspond to at least one of different color pixel ratios and different light reflectances. Further, the processor 110 may obtain the background image 302 corresponding to the current sensing object (finger) according to at least one of the color pixel ratio and the light reflectance. In step S240, the processor 110 corrects the fingerprint image 303 according to the background image 302 to obtain a corrected fingerprint image 304. In this embodiment, the processor 110 may perform background noise removal process on the fingerprint image by using this background image. Therefore, the electronic apparatus 100 provided by this disclosure may obtain the corrected fingerprint image 340 of which the background noise is removed. Further, a manner configured for establishing the background database 142 and a manner configured for obtaining the reference background images 301_1 to 301_N are described in details through the embodiments provided as follows.

Figure 4:
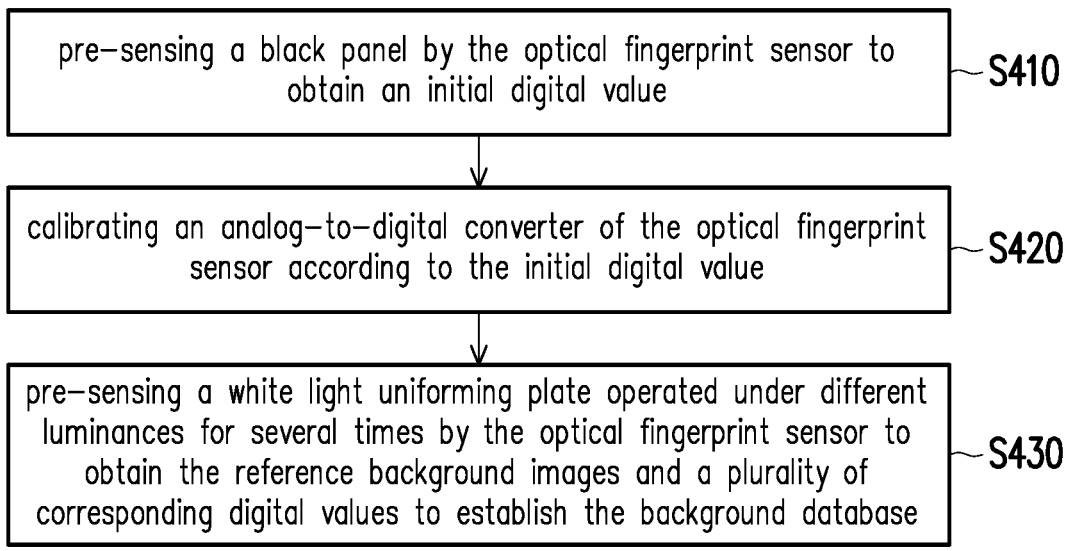
FIG. 4 is a flow chart of establishing a background database according to a first embodiment of the disclosure.

FIG. 4 is a flow chart of establishing a background database according to a first embodiment of the disclosure. With reference to FIG. 1, FIG. 3, and FIG. 4, the reference background images 301_1 to 301_N stored in the background database 142 may be background images corresponding to different digital values (light reflectances), for example. The electronic apparatus 100 may perform the following steps S410 to S430 to pre-establish the background database 142. In step S410, the electronic apparatus 100 may pre-sense a black panel through the optical fingerprint sensor 110 to obtain an initial digital value. In this embodiment, the black panel may be attached on the panel 130, for example, so that the optical fingerprint sensor 110 may sense an initial digital value with a reflectance of almost 0, and the digital value is an analog-to-digital converter code (ADC code). In step S420, the processor 110 may calibrate an analog-to-digital converter in the optical fingerprint sensor 110 according to the initial digital value. That is, in the electronic apparatus 100 provided by the present embodiment, calibration of the analog-to-digital converter of the optical fingerprint sensor 110 may be performed first, such that a correct digital value may be obtained by the electronic apparatus 100 in the following fingerprint sensing process.

In step S430, the processor 110 pre-senses a white light uniforming plate operated under different luminances through the optical fingerprint sensor 120 for several times to obtain the reference background images 301_1 to 301_N and a plurality of corresponding digital values to establish the background database 142. In this embodiment, the white light uniforming plate may be attached on the panel 130, for example, such that the optical fingerprint sensor 110 may sense and simulate the reference background images 301_1 to 301_N of different reflectance results and corresponding digital values thereof along with luminance adjustment (luminance may be adjusted to 10% and 20% to 100% in sequence, for example) of the white light uniforming plate. Therefore, as shown in step S220 and step S230 of FIG. 2, the processor 110 may calculate the light reflectance of the current fingerprint image 303, and the processor 110 may search for the background image 302 with the corresponding digital value (light reflectance) among the reference background images 301_1 to 301_N according to the digital value converted based on such light reflectance. Therefore, in the electronic apparatus 100 provided by the present embodiment, the processor 110 may perform background noise removal processing on the currently-obtained fingerprint image 303 through using the background image 302 with the corresponding light reflectance and thus effectively obtains the corrected fingerprint image 304.

Figure 5:
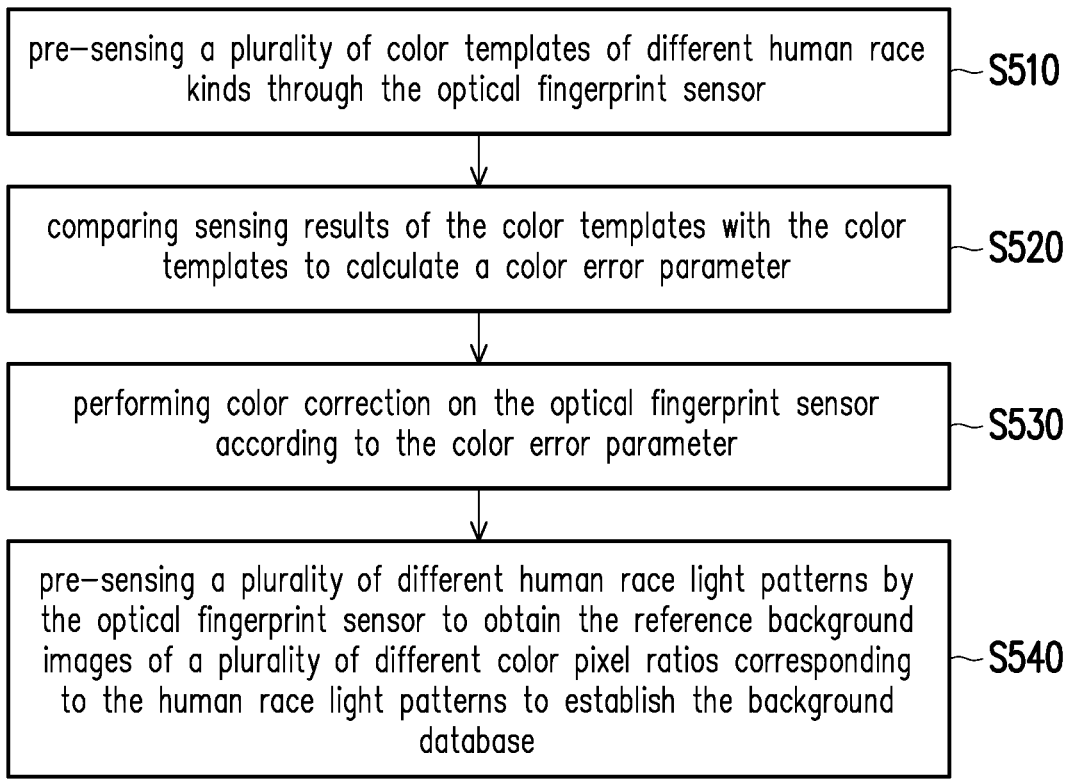
FIG. 5 is a flow chart of establishing the background database according to a second embodiment of the disclosure.
Figure 6:
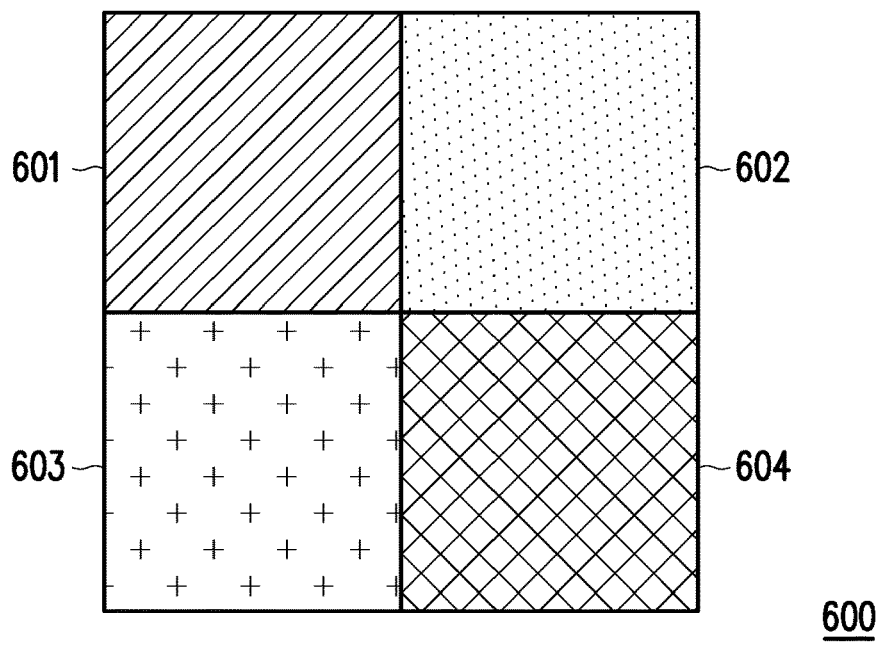
FIG. 6 is a schematic view of a plurality of human race light patterns according to an embodiment of the disclosure.

FIG. 5 is a flow chart of establishing the background database according to a second embodiment of the disclosure. FIG. 6 is a schematic view of a plurality of human race light patterns according to an embodiment of the disclosure. With reference to FIG. 1, FIG. 3, FIG. 5, and FIG. 6, the reference background images 301_1 to 301_N stored in the background database 142 may be background images corresponding to different color pixel ratios (different human race skin colors), for example. The electronic apparatus 100 may perform the following steps S510 to S540 to pre-establish the background database 142. In step S510, the processor 110 may pre-sense a plurality of color templates of different human race skin colors through the optical fingerprint sensor 120 first. In this embodiment, the color templates may include, for example, one or a plurality of silicon plates corresponding to different human race skin colors. Further, the one or plural silicon plates may be, for example, completely attached on the panel 130 one by one, such that the optical fingerprint sensor 110 may simultaneously or separately sense sensing results corresponding to the different colors of the different human race skin colors. In step S520, the processor 110 compares the sensing results of the color templates with true color values of the color templates to calculate color error parameters. In step S530, the processor 110 performs color correction on the optical fingerprint sensor 120 according to the color error parameters. In the present embodiment, the processor 110 may correct an error between the sensing results of the sensor and a test object through a color correction matrix first, for example.

That is, in the electronic apparatus 100 provided by the present embodiment, color correction may be performed on the optical fingerprint sensor 110 first, such that accurate color information of the fingerprint image may be obtained by the electronic apparatus 100 in the following fingerprint sensing process.

In step S540, the electronic apparatus 100 may pre-sense a plurality of different human race light patterns through the optical fingerprint sensor 120 to obtain the reference background images 301_1 to 301_N of the different color pixel ratios corresponding to the human race light patterns to establish the background database 142. In the present embodiment, the human race light patterns refer to specific patterns which are defined according to a plurality of different human race skin colors. In the present embodiment, the human race light patterns may be provided by a color light uniforming plate or by color card samples. For instance, the human race light patterns may be provided by a color light uniforming plate 600 shown in FIG. 6, and the color light uniforming plate 600 may be divided into sections. A plurality of human race light patterns 601 to 604 of different human race skin colors may be simultaneously displayed by the sections of the color light uniforming plate 600, or the color light uniforming plate 600 may display the human race light patterns 601 to 604 sequentially to obtain each color pixel ratio of different human race skin colors. The color pixel ratio includes a first color pixel ratio and a second color pixel ratio. The first color pixel ratio may be a red pixel average value of the fingerprint image divided by a green pixel average value of the fingerprint image (R/G), and the second color pixel ratio may be a blue pixel average value of the fingerprint image divided by the green pixel average value of the fingerprint image (B/G).

Accordingly, since the color pixel ratios corresponding to different human race skin colors are different, the electronic apparatus 100 provided by this embodiment may sense the color light uniforming plate displaying the human race skin colors to obtain the reference background images 301_1 to 301_N corresponding to the human race skin colors to establish the background database 142. Therefore, as shown in step S220 and step S230 of FIG. 2, the processor 110 may calculate the color pixel ratio of the current fingerprint image 303, and the processor 110 may search for the background image 302 with the corresponding color pixel ratio among the background images 301_1 to 301_N according to such color pixel ratio. Therefore, in the electronic apparatus 100 provided by the present embodiment, the processor 110 may perform background noise removal processing on the currently-obtained fingerprint image 303 through using the background image 302 with the corresponding color pixel ratio and thus effectively obtains the corrected fingerprint image 304.

Figure 7:
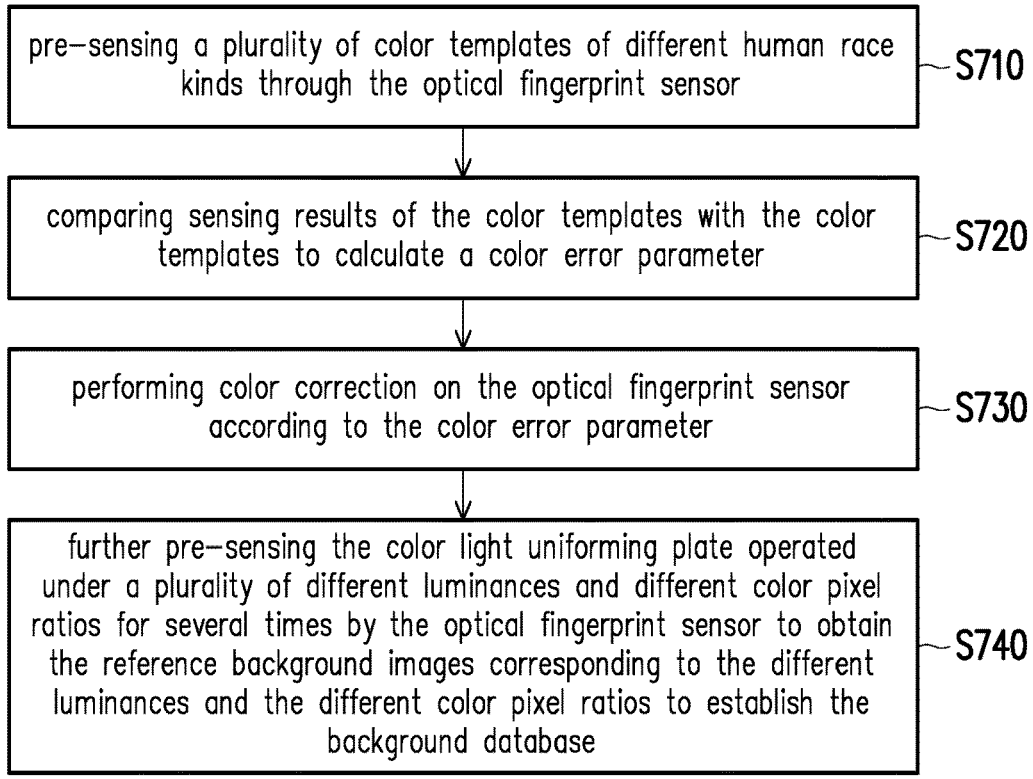
FIG. 7 is a flow chart of establishing the background database according to a third embodiment of the disclosure.

FIG. 7 is a flow chart of establishing the background database according to a third embodiment of the disclosure. With reference to FIG. 1, FIG. 3, FIG. 5, and FIG. 7, the reference background images 301_1 to 301_N stored in the background database 142 may be background images corresponding to different color pixel ratios (different human race skin colors) and corresponding to different digital values (light reflectance), for example. The electronic apparatus 100 may perform the following steps S710 to S740 to pre-establish the background database 142. Nevertheless, similar to steps S510 to S530 provided by the embodiment of FIG. 5, in steps S710 to S730 provided by this embodiment, color correction is performed on the optical fingerprint sensor 110 first, such that accurate color information of the fingerprint image may be obtained by the electronic apparatus 100 in the following fingerprint sensing process. Therefore, description which may be found with reference to the description of the embodiment of FIG. 5 is not repeatedly provided in the description of steps S710 to S730.

In step S740, in the electronic apparatus 100, the optical fingerprint sensor 120 may further pre-sense the color light uniforming plate operated under a plurality of different luminances and different color pixel ratios for several times to obtain the reference background images 301_1 to 301_N corresponding to the different luminances and the different color pixel ratios to establish the background database 142. For instance, the color light uniforming plate 600 shown in FIG. 6 may be divided into sections and simultaneously displays the human race light patterns 601 to 604 of different human race skin colors to obtain each color pixel ratio of different human race skin colors. Further, the color light uniforming plate 600 may be completely attached on the panel 130, for example, such that the optical fingerprint sensor 110 may further sense and simulate the reference background images 301_1 to 301_N of different reflectance results corresponding to different human race skin colors and corresponding color pixel ratios and the digital values thereof along with luminance adjustment (luminance may be adjusted to 10% and 20% to 100% in sequence, for example) of the color light uniforming plate 600. Therefore, as in step S220 and step S230 of FIG. 2, the processor 110 may calculate the color pixel ratio and the light reflectance of the current fingerprint image 303, and the processor 110 may determine the specific human race skin color first according to such color pixel ratio and searches for the background image 302 corresponding to the color pixel ratio (the specific human race skin color) with the corresponding digital value (light reflectance) among the reference background images 301_1 to 301_N according to the digital value converted based on such light reflectance. Therefore, in the electronic apparatus 100 provided by the present embodiment, the processor 110 may perform background noise removal processing on the currently-obtained fingerprint image 303 through using the background image 302 with the corresponding light reflectance and thus effectively obtains the corrected fingerprint image 304.

In view of the foregoing, in the electronic apparatus and the operating method thereof provided by the disclosure, the background database may be pre-established. The reference background images of the background database may correspond to at least one of the different color pixel ratios and the different light reflectances. In this way, the electronic apparatus provided by the disclosure may search the background database according to at least one of the color pixel ratio and the light reflectance corresponding to the current fingerprint image, so as to obtain the background image most suitable to the human race skin color or the light reflectance of the sensing object and effectively eliminate or reduce the background noise in the fingerprint image according to such background image.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. An electronic apparatus, comprising:
an optical fingerprint sensor, configured to obtain a fingerprint image; and a processor, coupled to the optical fingerprint sensor, analyzing the fingerprint image to calculate at least one of a color pixel ratio and a light reflectance corresponding to the fingerprint image, wherein the processor searches a background database according to at least one of the color pixel ratio and the light reflectance to obtain a background image, and the processor corrects the fingerprint image according to the background image to obtain a corrected fingerprint image.

2. The electronic apparatus according to claim 1, wherein the processor searches a plurality of reference background images of the background database according to at least one of the color pixel ratio of the fingerprint image and a digital value calculated through the light reflectance to obtain the background image, wherein the digital value is an analog-to-digital converter code.

3. The electronic apparatus according to claim 2, wherein the optical fingerprint sensor pre-senses a white light uniforming plate operated under different luminances for several times to obtain the reference background images and a plurality of corresponding digital values to establish the background database.

4. The electronic apparatus according to claim 2, wherein the optical fingerprint sensor pre-senses a black panel to obtain an initial digital value, and the processor calibrates an analog-to-digital converter of the optical fingerprint sensor according to the initial digital value.

5. The electronic apparatus according to claim 2, wherein the optical fingerprint sensor pre-senses a plurality of different human race light patterns or a plurality of color card samples to obtain the reference background images of a plurality of different color pixel ratios corresponding to the human race light patterns or the color card samples to establish the background database.

6. The electronic apparatus according to claim 5, wherein the human race light patterns are provided by a color light uniforming plate.

7. The electronic apparatus according to claim 5, wherein the optical fingerprint sensor further pre-senses the color light uniforming plate operated under a plurality of different luminances and different color pixel ratios for several times to obtain the reference background images corresponding to the different luminances and the different color pixel ratios to establish the background database.

8. The electronic apparatus according to claim 6, wherein the human race light patterns are provided by a plurality of sections of the color light uniforming plate simultaneously, or the color light uniforming plate displays the human race light patterns sequentially.

9. The electronic apparatus according to claim 5, wherein the optical fingerprint sensor pre-senses a plurality of color templates of different human race kinds, the processor compares sensing results of the color templates with the color templates to calculate a color error parameter, and the processor performs color correction on the optical fingerprint sensor according to the color error parameter.

10. The electronic apparatus according to claim 1, wherein the color pixel ratio comprises a first color pixel ratio and a second color pixel ratio, wherein the first color pixel ratio is a red pixel average value of the fingerprint image divided by a green pixel average value of the fingerprint image, and the second color pixel ratio is a blue pixel average value of the fingerprint image divided by the green pixel average value of the fingerprint image.

11. An operating method, adapted for an electronic apparatus comprising an optical fingerprint sensor and a background database, wherein the operating method comprises:

obtaining a fingerprint image through the optical fingerprint sensor;

analyzing the fingerprint image to calculate at least one of a color pixel ratio and a light reflectance corresponding to the fingerprint image;

searching the background database according to at least one of the color pixel ratio and the light reflectance to obtain a background image, and correcting the fingerprint image according to the background image to obtain a corrected fingerprint image.

12. The operating method according to claim 11, wherein the step of obtaining the background image comprises:

searching a plurality of reference background images of the background database according to at least one of the color pixel ratio of the fingerprint image and a digital value calculated through the light reflectance to obtain the background image, wherein the digital value is an analog-to-digital converter code.

13. The operation method according to claim 12, comprising:

pre-sensing a white light uniforming plate operated under different luminances for several times by the optical fingerprint sensor to obtain the reference background images and a plurality of corresponding digital values to establish the background database.

14. The operation method according to claim 12, comprising:

pre-sensing a black panel by the optical fingerprint sensor to obtain an initial digital value; and calibrating an analog-to-digital converter of the optical fingerprint sensor according to the initial digital value.

15. The operation method according to claim 12, comprising:

pre-sensing a plurality of different human race light patterns or a plurality of color card samples by the optical fingerprint sensor to obtain the reference background images of a plurality of different color pixel ratios corresponding to the human race light patterns or the color card samples to establish the background database.

16. The operating method according to claim 15, wherein the human race light patterns are provided by a color light uniforming plate.

17. The operating method according to claim 16, wherein the step of establishing the background database further comprises:

further pre-sensing the color light uniforming plate operated under a plurality of different luminances and different color pixel ratios for several times by the optical fingerprint sensor to obtain the reference background images corresponding to the different luminances and the different color pixel ratios to establish the background database.

18. The operating method according to claim 16, wherein the human race light patterns are provided by a plurality of sections of the color light uniforming plate simultaneously, or the color light uniforming plate displays the human race light patterns sequentially.

19. The operation method according to claim 15, further comprising:

pre-sensing a plurality of color templates of different human race kinds through the optical fingerprint sensor;

comparing sensing results of the color templates with the color templates to calculate a color error parameter; and performing color correction on the optical fingerprint sensor according to the color error parameter.

20. The operating method according to claim 11, wherein the color pixel ratio comprises a first color pixel ratio and a second color pixel ratio, wherein the first color pixel ratio is a red pixel average value of the fingerprint image divided by a green pixel average value of the fingerprint image, and the second color pixel ratio is a blue pixel average value of the fingerprint image divided by the green pixel average value of the fingerprint image.

* * * * *